Denis R. Tanguy
INVENTOR.

BY Richard E. Bee

ATTORNEY

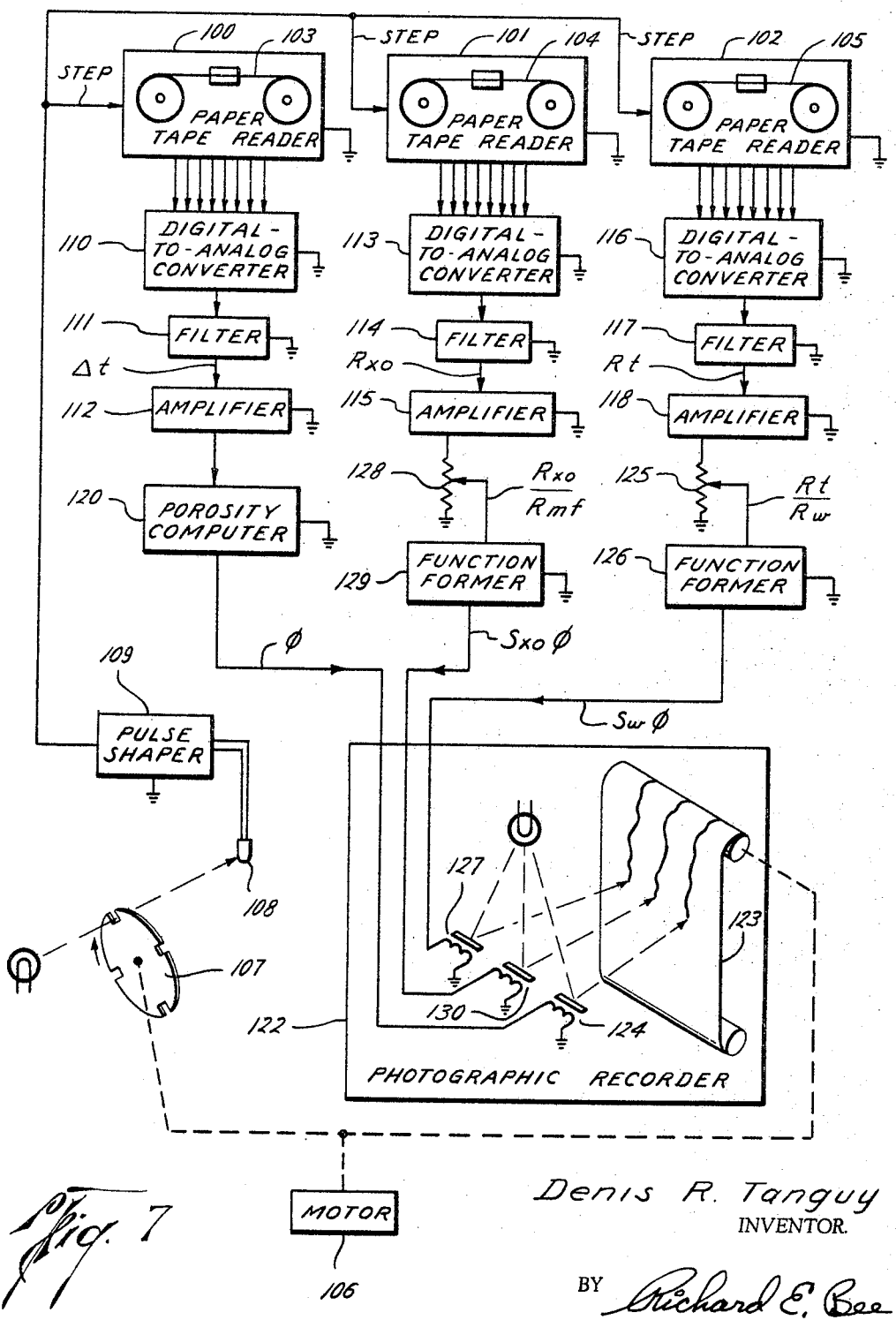

United States Patent Office 3,329,931
Patented July 4, 1967

3,329,931
METHODS AND SYSTEMS FOR RECORDING AND PROCESSING WELL LOGGING DATA
Denis R. Tanguy, Houston, Tex., assignor to Schlumberger Technology Corporation, Houston, Tex., a corporation of Texas
Filed Dec. 20, 1962, Ser. No. 246,201
32 Claims. (Cl. 340—18)

This invention relates to methods and systems for investigating boreholes drilled into the earth and, particularly, to methods and systems for determining the nature of the subsurface earth formations adjacent the borehole.

In the investigation or logging of boreholes drilled into the earth, much useful information concerning subsurface conditions is obtained by moving various exploring or measuring devices through the borehole by means of a cable suspended from the surface of the earth. Because of the limited confines of the borehole and the practical limits on the size and weight of the apparatus that can be suspended at the lower end of the cable, it is frequently difficult to make all of the desired measurements on a single trip into the borehole. Instead, two or more trips are made into the borehole, each time with a different measuring device or set of measuring devices.

Another factor which limits the number of measurements which can be made on a single trip into the borehole is that some types of measuring devices cannot be very readily combined into a single piece of apparatus. This may result from the physical sizes of the measuring devices, from particular mechanical requirements of the measuring devices which conflict with one another or from particular operating characteristics which tend to interfere with one another.

Where more than one trip into the borehole is required, the measurements made on the different trips are recorded on different recorder graph sheets or "logs." In order to determine various subsurface conditions of interest, it is frequently necessary that the measurements recorded on the different graph sheets be compared and correlated with one another. This, however, is rather difficult to do where the graph sheets have recorded thereon continuous curves representing continuous measurements made over several thousand feet of borehole length. It is tedious, time-consuming, relatively expensive and subject to the occurrence of human errors. In many cases, furthermore, it is necessary to combine various measurements made at corresponding depths in the borehole in accordance with a particular mathematical equation or formula in order to determine a more meaningful or more significant subsurface relationship. This is particularly difficult where the different measurements are recorded in a continuous manner on different graph sheets for several thousand feet of borehole length.

It is an object of the invention, therefore, to provide new and improved methods of investigation for boreholes drilled into the earth whereby measurements made on different trips through the borehole may be coordinated or combined in a rapid, efficient, and relatively inexpensive manner.

It is another object of the invention to provide new and improved methods of investigating boreholes whereby measurements recorded on different trips through the borehole may be readily and accurately re-recorded onto a common recording medium.

It is a further object of the invention to provide new and improved methods of investigating boreholes whereby measurements on different trips through the borehole may be readily and accurately combined for purposes of computing additional subsurface relationships or characteristics.

It is an additional object of the invention to provide new and improved methods of investigating boreholes which provide greater flexibility in the use of the data obtained during the investigation.

In accordance with one feature of the invention, a method of investigation for boreholes drilled into the earth comprises moving a first measuring device through the borehole for developing a first signal representative of a subsurface condition and recording indications of this first signal on a first recording medium. The method also includes moving a second measuring device through the borehole for developing a second signal representative of a subsurface condition and recording indications of this second signal on a second recording medium. The method further includes synchronously reproducing the signal indications recorded on the two recording media for providing concurrent indications of the subsurface conditions as a function of depth in the borehole.

In accordance with another feature of the invention, a novel combination of apparatus is provided for a borehole investigating system wherein a measuring device is moved through the borehole by means of a cable suspended from the surface of the earth. The combination includes an unloaded measuring wheel adapted to engage the cable and be rotated by movement thereof. The combination also includes tape recording means for recording indications of the measuring device signals on a recording tape. The combination further includes signal generating means coupled to the measuring wheel for producing synchronizing signals representative of the movement of the measuring device through the borehole while causing negligible loading on the measuring wheel. The combination additionally includes means for supplying the synchronizing signals to the tape recording means for synchronizing the movement of the recording tape with the movement of the measuring device through the borehole.

For a better understanding of the present invention, together with other and further objects and features thereof, reference is had to the following description taken in connection with the accompanying drawings, the scope of the invention being pointed out in the appended claims.

Referring to the drawings:

FIG. 7 represents in a schematic manner apparatus used in performing a third method in accordance with the present invention.

Figure 1:
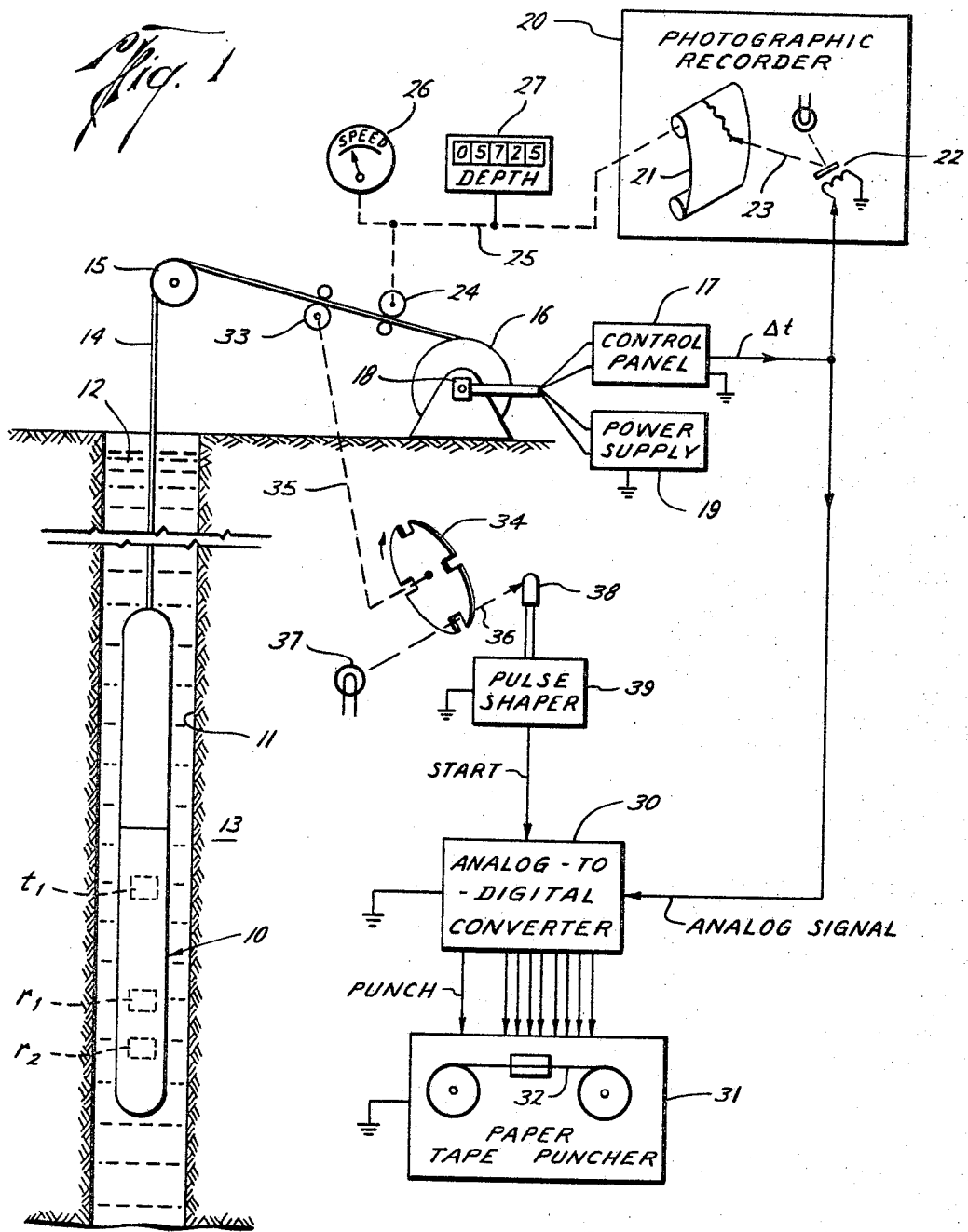
FIG. 1 illustrates in a schematic manner apparatus for performing a first step in accordance with one method of the present invention.

Referring to FIG. 1 of the drawings, there is shown a first measuring device 10 adapted for movement through a borehole 11 for developing a first signal representative of a subsurface condition. Borehole 11 is filled with a drilling fluid 12. In the present embodiment, this first measuring device comprises a sonic logging system for measuring the travel time of an acoustic signal through the adjacent earth formation material 13. The sonic logging system includes a transmitter $t_1$ for emitting an acoustic signal and a pair of receivers $r_1$ and $r_2$ for measuring the difference in time required for the acoustic signal to reach these receivers. The measuring device 10 is moved through the borehole 11 by means of an armored, multiconductor cable 14 which is suspended from the surface of the earth by way of a pulley 15 and a drum-and-winch mechanism 16. The individual insulated conductors within the cable 14 are used to convey the electrical signals developed by the downhole apparatus 10 to the surface of the earth. These signals are supplied to a surface control panel 17 by way of a suitable brush and slip-ring assembly 18 associated with the winch mechanism 16. Suitable electrical power for operating the downhole equipment is provided by a power supply 19 located at the surface of the earth.

The sonic travel time signal $\Delta t$ appearing at output of control panel 17 is supplied to a photographic recorder 20 which records this signal in a continuous manner on a moving photosensitive recording medium 21. This is done by means of a mirror-type galvanometer 22 which controls the deflection of a light beam 23 across the photosensitive recording medium 21. In order to move or advance the photosensitive recording medium 21 in synchronism with the movement of the measuring device 10 through the borehole 11, there is provided a measuring wheel 24 which engages the cable 14 and is rotated as the cable 14 moves across the periphery thereof. This measuring wheel 24 is coupled to the photographic recorder 20 and, in particular, to the roller mechanism associated with the photosensitive recording medium 21 by way of a suitable linkage mechanism indicated schematically by dash line 25. This linkage mechanism 25 drives the photosensitive recording medium 21 in synchronism with the rotation of the measuring wheel 24 and, hence, in synchronism with the vertical movement of the measuring device 10. The measuring wheel 24 is also used to drive other indicating devices such as a speed indicator 26 and a depth indicator 27.

The sonic travel time signal $\Delta t$ is also supplied to tape recording means which records indications of this signal on a recording tape which is moved in synchronism with the movement of the measuring device 10 through the borehole 11. This tape recording means includes an analog-to-digital converter 30 and a paper tape puncher 31. The converter 30 serves to convert the analog $\Delta t$ signal to an eight-bit parallel binary code signal which controls the punching action of the paper tape puncher 31 so that indications of this signal are recorded on a paper recording tape 32 in the form of binary coded perforations.

Depth synchronizing means are provided for driving the paper recording tape 32 in synchronism with the movement of the measuring device 10 through the borehole 11. This depth synchronizing means includes an unloaded measuring wheel 33 which engages the cable 14 and is rotated by the movement of the cable across the periphery thereof. The depth synchronizing means also includes low-torque signal generating means for producing synchronizing signals in the form of a synchronizing pulse each time the measuring device 10 moves a predetermined incremental distance in the borehole 11. This signal generating or pulse generating means includes a rotatable disc 34 of opaque material having several light-transmitting slots or windows cut into the edges thereof. Disc 34 is mechanically coupled to and driven by the unloaded measuring wheel 33 by way of a linkage mechanism represented by dash line 35. The disc 34 is disposed in the path of a light beam 36 which would otherwise pass from a light source 37 to a photocell or photodiode 38. Disc 34 serves to interrupt the light beam 36 so that light energy is supplied to the photocell 38 in the form of a short burst or pulse each time a slot in the disc 34 crosses the path of light beam 36. The resulting electrical pulses generated by the photocell 38 are re-shaped by a pulse shaper 39 to impart a sharper, rectangular shape thereto. These sharpened pulses from pulse shaper 39 are then supplied to the tape recording means represented by converter 30 and paper tape puncher 31 for synchronizing the movement of the recording tape 32 with the movement of the borehole measuring device 10. A suitable form of construction for the unloaded measuring wheel 33, linkage mechanism 35 and disc 34 is one that will provide a synchronizing pulse each time the borehole measuring device moves a distance of two inches in the borehole.

As will be more fully appreciated hereinafter, considerable care must be exercised in the construction of the depth synchronizing means for the tape recorder so that there is very accurate and precise correspondence between the movement of the cable 14 and the movement of the recording tape 32. To this end, the main body of the unloaded measuring wheel 33 is constructed of a metal, such as Invar, which is relatively insensitive to temperature changes. The wheel 33 is then provided with a rim constructed from a hard, durable metal, such as tungsten carbide. Also, the outer surface of the rim is made as flat as possible. The wheel 33 is mounted in such a manner that there is as little mechanical friction as possible opposing the rotation thereof. Also, the rotating disc 34 and the linkage mechanism 35 are constructed to provide negligible loading on the measuring wheel 33. As a consequence, the measuring wheel 33 remains essentially unloaded during the operation of the apparatus. This means that there will be substantially no slippage of the cable 14 relative to the measuring wheel 33.

By way of contrast, the measuring wheel 24 which drives the photographic recorder 20 is relatively heavily loaded. Consequently, undesirable slippage of the cable 14 relative to the wheel 24 is experienced, particularly when sudden changes occur in the speed of the cable 14. This is one reason why manual depth adjustment means are provided for present-day photographic recorders for adjusting the recorder depth readings during the course of the borehole investigation.

Figure 2:
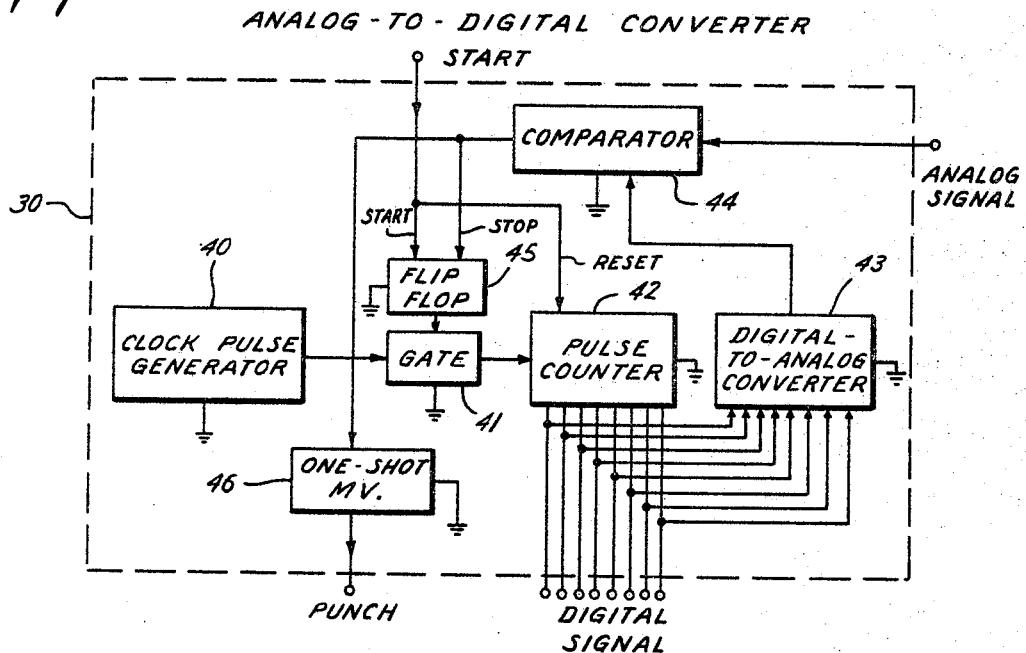
FIG. 2 is a schematic circuit diagram showing in greater detail the construction of an analog-to-digital converter which is used in the FIG. 1 apparatus.

Referring now to FIG. 2, there is shown in greater detail the manner of construction of the analog-to-digital converter 30. As seen in FIG. 2, the converter 30 includes a clock pulse generator 40 for supplying periodic high-frequency pulses by way of a gate circuit 41 to the counting input of a pulse counter 42. The clock pulse frequency is constant and is sufficiently high so that the pulse counter 42 can traverse its entire counting range intermediate the occurrence of successive depth synchronizing pulses from the photocell 38. The parallel binary output lines from the pulse counter 42 are coupled to a digital-to-analog converter 43. Converter 43 operates to produce an analog output signal which is proportional to the count in the pulse counter 42 at any given moment. This analog signal is supplied to a comparator 44. The analog signal developed by the borehole measuring device is supplied to a second input of the comparator 44. Comparator 44 produces an output pulse at the moment that the analog signal from converter 43 first becomes equal to the borehole analog signal.

Considering the sequence of operations for the analog-to-digital converter 30, when a pulse is generated by the photocell 38, this pulse ("START" pulse) is supplied to a reset terminal of the pulse counter 42. This resets the counter 42 to zero. At the same time, this depth-synchronizing "START" pulse is supplied to a flip-flop circuit 45 to set it to a particular one of its two stable states. This particular state serves to render the gate circuit 41 conductive so that clock pulses can pass from the generator 40 to the counter 42. Counter 42 commences to count these pulses. At the same time, the converter 43 is continuously operative to convert the pulse count in counter 42 to a corresponding analog signal. This analog signal is compared by comparator 44 with the borehole analog signal. At the moment the converter signal becomes equal to the borehole signal, comparator 44 generates an output pulse. This output pulse is supplied back to the flip-flop circuit 45 to set it to its other state. This other state renders the gate circuit 41 non-conductive so that no further clock pulses are supplied to the counter 42. Thus, there is now contained in the counter 42 a digital or binary representation of the analog signal being supplied by the borehole measuring device. This digital representation or indication is supplied to the punching heads of the paper tape puncher 31 by way of the parallel binary output lines from the pulse counter 42.

The output pulse generated by comparator 44 is also supplied to a one-shot multivibrator 46. In response thereto, multivibrator 46 generates a suitable pulse for operating the punching mechanism of the paper tape puncher 31. Thus, when the pulse counter 42 contains the proper count value the multivibrator 46 is activated to supply a "PUNCH" pulse to the paper tape puncher 31. This causes the paper tape puncher 31 to punch the appropriate perforations across the width of the paper recording tape 32. When the punching operation is completed, the paper tape puncher 31 operates to automatically advance the paper recording tape 32 by a fixed increment. The paper tape puncher 31 and converter 30 are then in condition to commence the next cycle of operation upon the occurence of the next depth synchronizing pulse at the output of the photocell 38. In this manner, each time a depth synchronizing pulses occurs, the analog signal from the borehole measuring device is converted to a digital signal, the digital signal is punched into the paper recording tape and the tape advanced a fixed increment.

Figure 3:
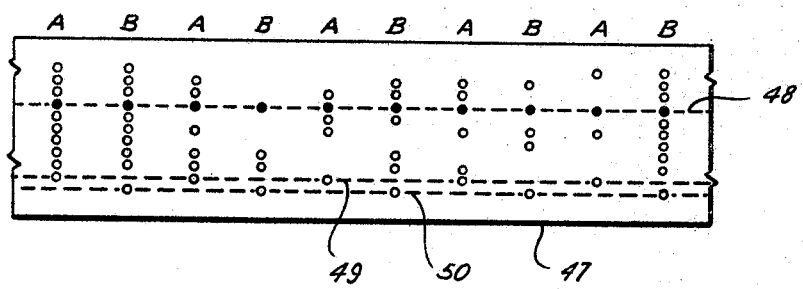
FIG. 3 shows a portion of a paper recording tape which is representative of that used in the present apparatus.

Referring now to FIG. 3 of the drawings, there is shown a portion 47 of a paper recording tape which is representative of that made by the paper tape puncher 31 during the course of the borehole investigation. The dark-colored holes located on dash line 48 are sprocket holes used in advancing the tape 47. The two lines of perforations lying on dash lines 49 and 50 are special control indications which will be considered hereinafter; they are not used in the case of the FIG. 1 apparatus. The remainder of the perforations on the paper recording tape 47 are used to represent the data values for the analog borehole signal, each vertical group of these perforations being a binary coded indication of the analog signal value at a given instant or, more accurately, at a given depth in the borehole. For the case of two-inch depth synchronizing pulses, the spacing between successive vertical groups on the tape 47 is proportional to a vertical distance of two inches in the borehole.

Figure 4:
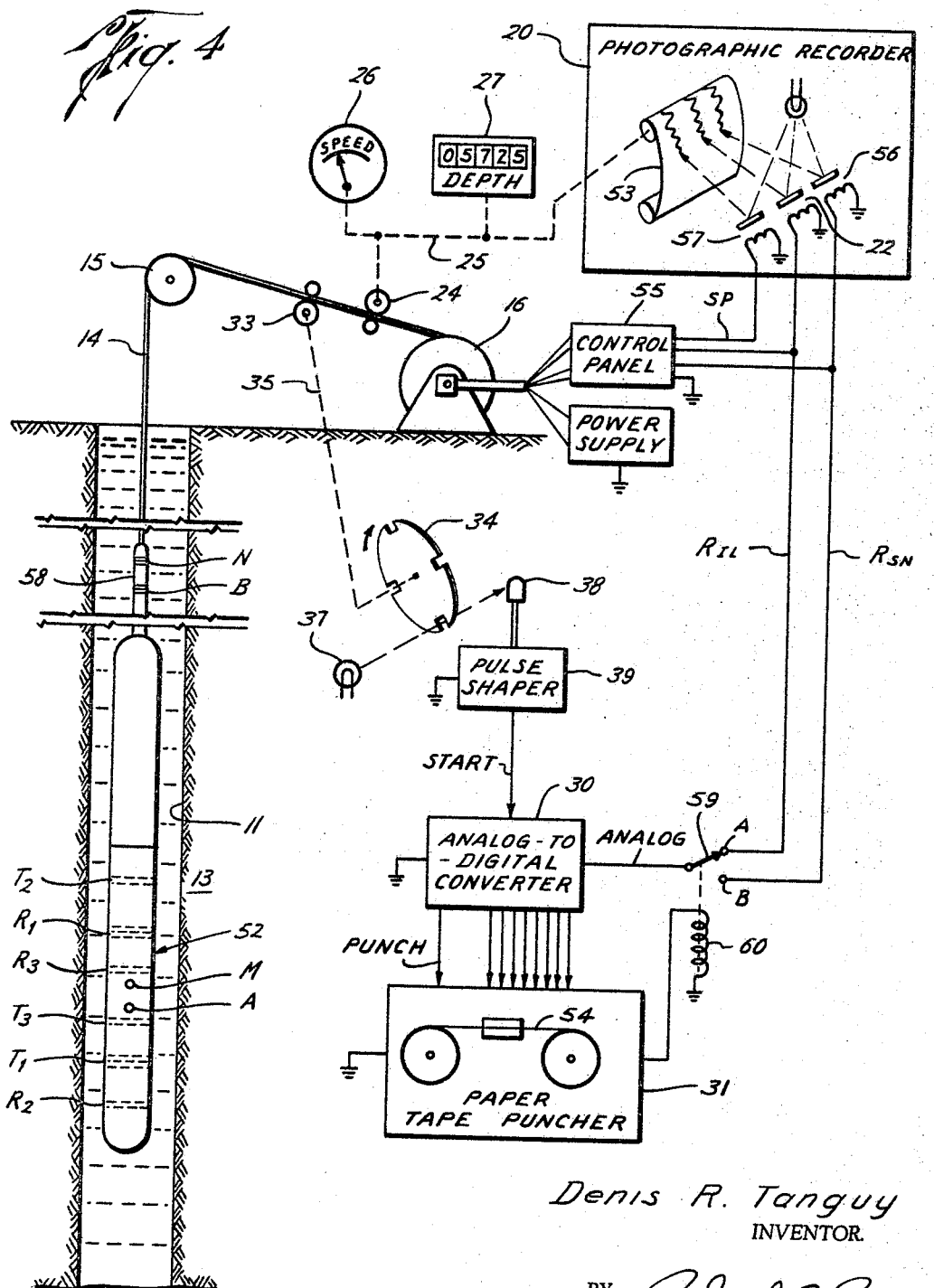
FIG. 4 represents in a schematic manner apparatus for performing a second step in accordance with the first method of the present invention.

Referring now to FIG. 4 of the drawings, there is shown apparatus for performing a second step in the general method presently being considered. This apparatus is the same apparatus used in the FIG. 1 step except for certain changes. In particular, after the borehole 11 is surveyed with the measuring device 10 of FIG. 1, the measuring device 10 is withdrawn from the borehole, removed from the lower end of cable 14 and a second and different investigating apparatus 52 is connected to the end of the cable 14. Also, the photosensitive recording medium 21 is removed from the photographic recorder 20 and the paper recording tape 32 is removed from the paper tape puncher 31. The photographic recorder 20 and the paper tape puncher 31 are then reloaded with a new photosensitive recording medium 53 and a new paper recording tape 54, respectively. The apparatus of FIG. 4 is then ready to make a second investigation of the borehole 11.

The investigating apparatus 52 of FIG. 4 differs from that of FIG. 1 in that it includes a pair of measuring devices for developing a pair of signals representative of subsurface conditions. A first of these measuring devices is a deep investigation coil-type induction logging system for measuring the electrical conductivity of the earth formation material near, but not immediately adjacent, the borehole 11. This induction logging system includes transmitter coils $T_1$, $T_2$ and $T_3$ and receiver coils $R_1$, $R_2$ and $R_3$. The receiver coils are interconnected in a series manner and the net voltage signal appearing thereacross as a result of electrical current flow induced in the formation material by the transmitter coils is directly proportional to the conductivity of such formation material. This signal is sent up the cable 14 to a control panel 55 located at the surface. Control panel 55 includes a reciprocator circuit for converting this conductivity signal to a signal which is proportional to the reciprocal thereof. This reciprocal signal, which is proportional to the resistivity of the formation material, is supplied to the galvanometer 22 of the photographic recorder 20.

The second measuring device included as part of the investigating system 52 is a so-called "short normal" type of electrode system having relatively shallow lateral investigation characteristics for measuring the resistivity of the formation material immediately adjacent the borehole 11. This short normal electrode system includes a current-emitting electrode A and a voltage-detecting electrode M. The electrode M is spaced a short distance (e.g., 16 inches) above the electrode A. The electrode system also includes a remote current-return electrode B and a remote voltage-reference electrode N mounted on a layer of insulation material 58 surrounding the lower end of the cable 14.

The signal developed by the short normal electrode system is sent up the cable 14 and through the control panel 55 to a second galvanometer 56 in the photographic recorder 20. In this regard, the photographic recorder 20 actually includes a bank of nine or more individual galvanometers, though, for present purposes, only as many of the galvanometers as are needed are shown in any given one of the drawings.

The investigating system 52 also includes a third measuring device in that provision is also made for measuring the naturally-occurring spontaneous earth potentials existing in the borehole 11. To this end, the voltage-detecting electrode M is also used to detect the spontaneous earth potential, which is of a direct current nature. This spontaneous potential signal is sent up the cable 14 and by way of the control panel 55 to a third galvanometer 57 in the photographic recorder 20.

The induction log resistivity signal $R_{IL}$ and the short normal electrode system resistivity signal $R_{SN}$ are also supplied to the tape recording means represented by the analog-to-digital converter 30 and the paper tape puncher 31. This is done by way of a relay controlled switch 59 which switches back and forth between switch terminals A and B so that the two resistivity signals are alternately supplied, one at a time, to the converter 30. Switch 59 is controlled by a relay coil 60 which in turn is controlled by the paper tape puncher 31.

The switching of switch 59 is determined by alternately placing distinguishable first and second control indications on the paper recording tape 54 before it is used to record the results of the borehole survey. These control indications are shown on the representative tape 47 of FIG. 3. The first control indications are the perforations which lie along dash line 49. The second control indications are the perforations which lie along dash line 50. As is seen, these control perforations occur in an alternate manner along the length of the tape 47. The perforations on line 49 define a series of recording positions denoted as A, while the perforations on line 50 define a series of recording positions denoted as B which are interlaced with positions A.

In order to provide a control signal for the relay coil 60, the paper tape puncher 31 is provided with suitable means for recognizing which of the two sets of control indications, A or B, is in line with the punching heads at any given moment. To this end, a pair of reading heads are placed alongside the punching heads so as to read the control data in the control tracks (e.g., tracks 49 and 50 of FIG. 3) of the tape. The resulting signals from these reading heads are used to supply the appropriate energizing current to the relay coil 60. As a consequence, switch 59 contacts switch terminal A whenever a control perforation of group A is in line with the punching heads, while it contacts switch terminal B whenever a control perforation of group B is in line with the punching heads.

Some types of commercial paper tape punchers are constructed in such a way that it is not convenient to place reading heads next to the punching heads. In a case like this, it has been found that the desired results can be obtained by means of an appropriate light beam and photocell system. In particular, a light reflective surface, such as a small polished metal plate, is placed beneath the two control tracks of the recording tape at the appropriate position in line with the punching heads. The light source and photocell are then positioned so that for one of the control tracks the light beam will be reflected into the photocell whenever a control perforation for this track is above the reflective surface. A second photocell and light source are then provided for the second control track on the recording tape. The resulting photocell signals are then used to control the energizing of the relay coil 60. This can be done by using the photocell signals to control a bistable flip-flop circuit which, in turn, drives the relay coil 60.

The movement of the paper recording tape 54 of FIG. 4 is synchronized with the movement of the investigating system 52 through the borehole 11 by means of the unloaded measuring wheel 33, the rotating disc 34 and the photocell 38 in the same manner as for the case of the FIG. 1 apparatus. Thus, the recording tape 54 is advanced one step each time the measuring apparatus 52 moves through a vertical distance of two inches in the borehole. At each position on the recording tape 54, a binary representation of one of the resistivity signals is punched into the tape 54. Since the two resistivity signals are alternately supplied to the converter 30, individual representations thereof are placed in alternate positions on the tape 54. In this manner, there is provided on the paper recording tape 54 a composite record of the two resistivity signals.

Figure 5:
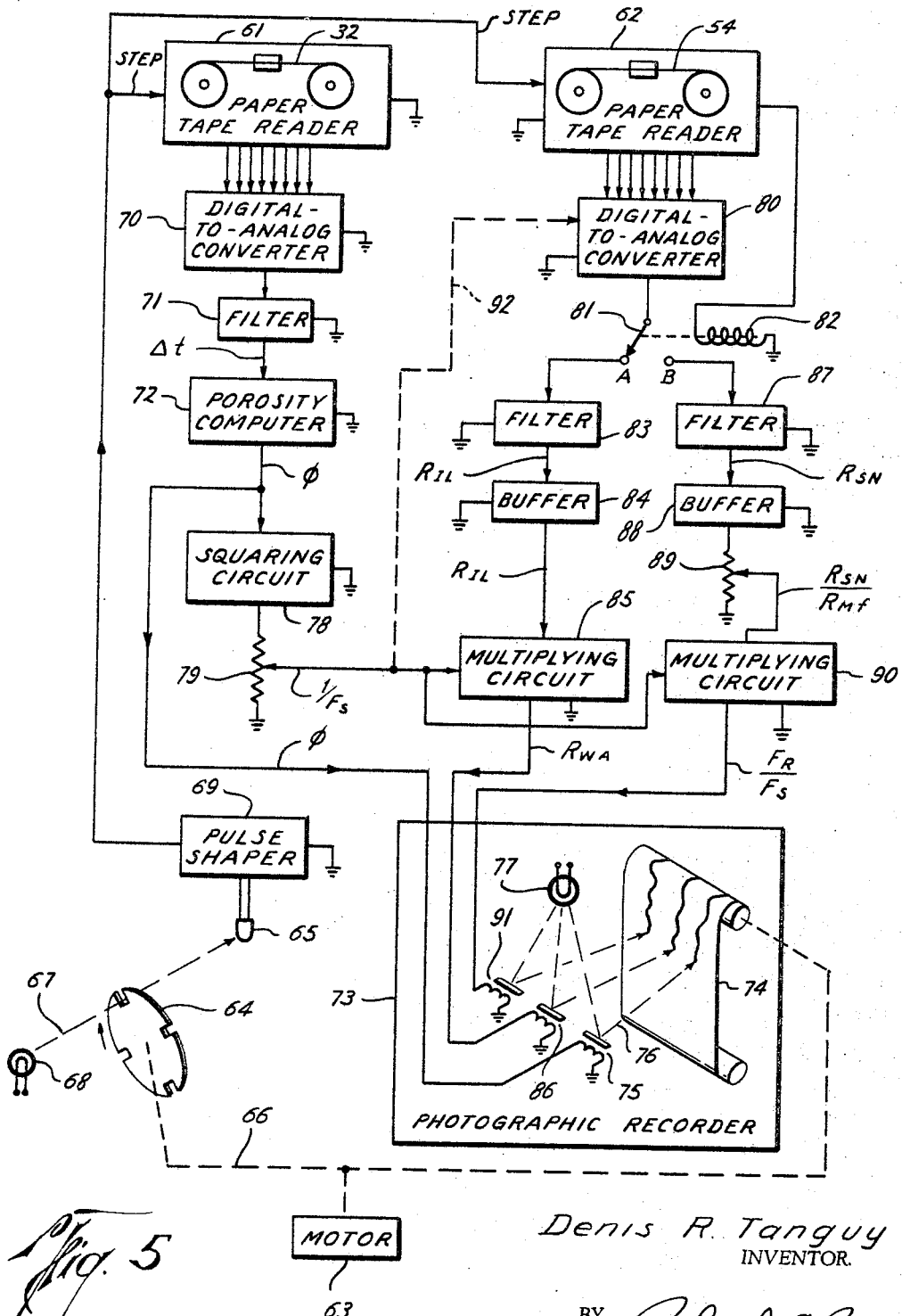
FIG. 5 represents in a schematic manner apparatus for performing a third step in accordance with the first method of the present invention.

Referring now to FIG. 5 of the drawings, there is shown apparatus for performing a third step in the general method presently being considered. More particularly, there is shown suitable apparatus for synchronously reproducing the signal indications previously recorded on the two recording tapes 32 and 54 of FIGS. 1 and 4, respectively, together with means for utilizing these reproduced indications in a particularly advantageous manner. To this end, the apparatus of FIG. 5 includes a pair of tape playback or reproducing means represented by paper tape readers 61 and 62. The paper recording tape 32 containing the $\Delta t$ sonic logging measurements made with the apparatus of FIG. 1 is placed on the paper tape reader 61. The paper recording tape 54 containing the two sets of interlaced resistivity measurements made with the apparatus of FIG. 4 is placed on the paper tape reader 62.

The two paper tape readers 61 and 62 are now operated in synchronism with one another so as to concurrently reproduce the measurements on the two recording tapes 32 and 54. This synchronous operation is obtained by means of a motor 63, a rotatable disc 64 and a photocell or photodiode 65. Motor 63 drives the disc 64 by means of the linkage mechanism represented schematically by dash line 66. The rotating disc 64 includes a number of slots or windows cut into the sides thereof for allowing passage of a light beam 67 from a light source 68 to the photocell 65. The resulting electrical pulses developed by photocell 65 are reshaped by a pulse shaper 69 to provide suitable synchronizing pulses for the paper tape readers 61 and 62. Each of these pulses is supplied to each of the paper tape readers 61 and 62 and each causes each of the readers 61 and 62 to advance its recording tape one step. In this manner, the two recording tapes 32 and 54 are moved in synchronism with one another.

The parallel binary output lines from the reading heads of the paper tape reader 61 are connected to a digital-to-analog converter 70. Converter 70 converts the parallel binary signal into a corresponding analog signal. This analog signal is supplied by way of a filter 71 to a porosity computer 72. The purpose of filter 71 is to smooth out the momentary discontinuities which occur in the analog signal while the paper recording tape 32 is advancing from one record position to the next. As a result of this filtering action, a continuous $\Delta t$ signal is supplied to the porosity computer 72. The porosity computer 72 operates to convert the $\Delta t$ sonic travel time signal to a signal which is proportional to the porosity $\phi$ of the earth formation material. Computer 72 is an analog computer for solving the equation:

$$\phi = k_1 \Delta t - k_2 \tag{1}$$

where $$k_1 = \frac{V_m V_f}{V_m - V_f} \tag{2}$$

and $$k_2 = \frac{V_f}{V_m - V_f} \tag{3}$$

where $\phi$ = formation porosity
$\Delta t$ = sonic travel time
$V_m$ = sound wave velocity in the rock matrix
$V_f$ = sound wave velocity in the interstitial fluid occupying the pore spaces in the rock matrix An appropriate manner of construction for the porosity computer 72 is described in greater detail in a copending application Serial No. 54,932, filed September 9, 1960, in the name of R. P. Alger. As there indicated, the porosity computer may also include a shale compaction circuit.

The resulting porosity signal $\phi$ is supplied to a photographic recorder 73 for purposes of recording a continuous indication thereof on a photosensitive recording medium 74. This is done by means of a mirror-type galvanometer 75 which operates to deflect a light beam 76 from a light source 77 across the recording medium 74. The photosensitive recording medium 74 is, at the same time, being moved in synchronism with the movement of the paper recording tape 32. This is accomplished by the motor 63 and linkage mechanism 66 which is also used to drive the roller mechanism associated with the recording medium 74.

It is desired to combine the various sonic and electrical resistivity signals for purposes of computing certain additional subsurface relationships as a function of depth in the borehole. One of these relationships is the apparent resistivity $R_{wa}$ of the connate formation water contained in the formation pore spaces. Another of these relationships is the ratio of $F_R$ to $F_S$, where $F_R$ is the formation factor as determined with a resistivity measuring device and $F_S$ is the formation factor as determined with a sonic measuring device. The geophysical significance of these two relationships is discussed in greater detail in a technical paper entitled "Modern Log Analysis" written by M. P. Tixier and appearing in the December 1962 issue of the Journal of Petroleum Technology. The $R_{wa}$ relationship is also considered in detail in the above-mentioned copending application Serial No. 54,932 of Alger. For present purposes, it is sufficient to understand that these relationships provide valuable and easier-to-interpret indications of the nature of the fluids contained in the formation pore spaces. This information is important in order to determine which, if any, of the subsurface formations contain producible hydrocarbons (oil, gas, etc.).

The relationship between the formation porosity $\phi$ and the formation factor F is described by the equation:

$$F = a/\phi^m \quad (4)$$

where $a$ and $m$ are constants which depend somewhat on the particular type of formation material being considered. For most sands and sandstones, a value of 0.81 for $a$ and a value of 2 for $m$ gives the correct relationship.

Using the assumed values for $a$ and $m$, it is convenient to rewrite Equation as follows:

$$\frac{1}{F} = \frac{\phi^2}{0.81} \quad (5)$$

The quantity $1/F$ is obtained with the apparatus of FIG. 5 by supplying the porosity signal $\phi$ to a squaring circuit 78. The resulting squared porosity signal is reproduced across a potentiometer 79. The sliding tap on potentiometer 79 is set in accordance with the particular value of $m$, in this case a value of 0.81. Thus, the signal at the sliding tap of potentiometer 79 corresponds to the quantity $1/F$ of Equation 5.

In order to bring the two resistivity signals into the computation, the parallel binary output lines from the second paper tape reader 62 are connected to a digital-to-analog converter 80. Converter 80 converts the parallel binary signals to equivalent analog signals. These analog signals are then selectively supplied to one or the other of a pair of output circuits or output channels by means of a relay-controlled switch 81. Under the control of a relay coil 82, the switch 81 is switched back and forth between a pair of switch terminals A and B. The energizing of relay coil 82 is controlled by the signals obtained from the reading heads of the paper tape reader 62 which are reading the control perforations in the control tracks (like tracks 49 and 50 of FIG. 3) of the paper recording tape 54. A flip-flop circuit can, if desired, be used to provide the energizing current which is actually supplied to the relay coil 82. In any event, switch 81 is at terminal A whenever a binary indication for the induction logging signal $R_{IL}$ is in line with the reading heads of paper tape reader 62. Similarly, the switch 81 is at terminal B whenever a binary indication for the short normal electrode signal $R_{SN}$ is in line with the reading heads of the paper tape reader 62.

Terminal A of switch 81 is connected by way of a filter 83 and a buffer circuit 84 to a first input of a multiplying circuit 85. The purpose of filter 83 is to smooth out the periodic discontinuities in the $R_{IL}$ signal which occur when the switch 81 is not at terminal A. Buffer circuit 84 may take the form of a buffer amplifier or a cathode follower and serves to provide the proper output impedance for the filter 83.

The $R_{wa}$ relationship which it is desired to compute is described by the equation:

$$R_{wa} = \frac{R_t \phi^2}{0.81} = \frac{R_t}{F} \quad (6)$$

where $R_t$ is the true or original resistance of the formation material prior to any contamination by the drilling fluid contained in the borehole. It is determined by measuring the resistivity of a formation zone which is sufficiently far removed from the borehole in a lateral or horizontal direction that it is not subject to drilling fluid contamination. $R_{wa}$ is the apparent resistivity of the connate formation water in such an uncontaminated zone. If the pore space in the uncontaminated zone is 100% saturated with connate formation water, then the apparent formation water resistivity is, in fact, the actual formation water resistivity. If, on the other hand, part of the pore space is occupied by a hydrocarbon fluid such as oil, the apparent formation water resistivity will be greater than the actual formation water resistivity.

In terms of the particular signals available in the apparatus of FIG. 5, the apparent formation water resistivity is:

$$R_{wa} = \frac{R_{IL}}{F_S} \quad (7)$$

where the subscript S denotes that the formation factor was determined from a sonic measurement. In order to derive a signal which is proportional to $R_{wa}$, it is necessary to multiply the $R_{IL}$ signal at the output of buffer 84 by the signal appearing on the sliding tap of potentiometer 79. This multiplication is performed by the multiplying circuit 85. The resulting $R_{wa}$ signal is supplied to a galvanometer 86 in the photographic recorder 73 so that a continuous indication thereof will be recorded on the common photosensitive recording medium 74.

Terminal B of switch 81, which terminal is used for the short normal electrode signal $R_{SN}$, is connected by way of a filter 87, a buffer circuit 88 and a potentiometer 89 to a second multiplying circuit 90. The purpose of these circuits is to develop a signal which is proportional to the ratio of $F_R$ to $F_S$. Since the value of $F_S$ is already available, it remains to determine the value of $F_R$. $F_R$ is the formation factor as determined by a resistivity measurement.

Another way of defining the formation factor F is as follows:

$$F = \frac{R_o}{R_w} = \frac{R_{xo}}{R_{mf}} \quad (8)$$

where $R_o$ is the resistivity of the formation when 100% saturated with connate formation water, $R_w$ is the resistivity of the connate formation water, $R_{xo}$ is the resistivity of the flushed zone immediately adjacent the borehole wall and $R_{mf}$ is the resistivity of the mud filtrate which is doing the flushing. Since the short normal resistivity signal $R_{SN}$ provides an indication of the resistivity of the formation region close to the borehole wall, the relationship of Equation 8 may be rewritten as:

$$F_R = \frac{R_{SN}}{R_{mf}} \quad (9)$$

where the subscript R denotes that the formation factor has been determined by means of a resistivity measurement.

In the apparatus of FIG. 5, the quantity $R_{mf}$ is introduced by the proper setting of the sliding tap on the potentiometer 89. The value of $R_{mf}$ for any particular borehole is determined by measuring the resistivity of a sample of the drilling fluid which is used in the borehole. The sliding tap on potentiometer 89 is then set at the appropriate value. The desired ratio of $F_R$ to $F_S$ is then obtained by multiplying the signal on the sliding tap of potentiometer 89 by the signal appearing on the sliding tap of potentiometer 79. This multiplication is performed by the multiplying circuit 90. The resulting ratio signal is then supplied to a galvanometer 91 located in the photographic recorder 73. This produces on the common photo-sensitive recording medium 74 a continuous curve or trace corresponding to the desired $F_R$ to $F_S$ ratio.

As is known, it is customary for photographic recorders to record grid lines and depth numbers on the photosensitive recording medium at appropriate periodic intervals. This is done by appropriate auxiliary apparatus in the recorder which is known in the art and not considered herein. In order that the recorder number marking apparatus and the paper recording tapes 32 and 54 may all start off together at the same depth level, it is only necessary to have made a notation of the depth readings at which the borehole investigations were commenced in the FIG. 1 and FIG. 4 steps. With this information, the number marking apparatus for the photographic recorder and the paper recording tapes 32 and 54 may be aligned to correspond to the same depth in the borehole before the playback operation of FIG. 5 is commenced.

An alternative method of multiplying the individual resistivity signals by the $1/F_s$ signal at the sliding tap of potentiometer 79 is indicated by optional dash line connection 92. When this method is used, the multiplying circuits 85 and 90 are omitted and the output of the buffer circuit 84 and the sliding tap of potentiometer 89 are connected directly to the respective galvanometers 86 and 91. In order to understand this method, it should be noted that the digital-to-analog converter 80 comprises a multiple-input weighted resistor network, a common voltage source for energizing these inputs and a vacuum tube or transistor switch for each input branch of the network for determining which branches are operative to supply current to a common load or output resistor. (The switches are controlled by the signals from the paper tape reader.) Consequently, if the common voltage source used to drive the resistor network is replaced by the voltage at the sliding tap of potentiometer 79, then the desired multiplication is obtained without need for separate multiplying circuits. This is the modification indicated by dash line connection 92. From the standpoint of equipment costs and circuit complexity, this optional method is preferred.

The playback method described in connection with FIG. 5 is particularly suitable where the recording tapes are recorded at the well site and are to be played back and computed at a later time at some central office location. If it is also desired to provide computed logs, such as that represented by the photo-sensitive recording medium 74 of FIG. 5, at the well site at the same time that the borehole surveys are being performed, then a modified method as will be described in connection with FIG. 6 may be used.

Figure 6:
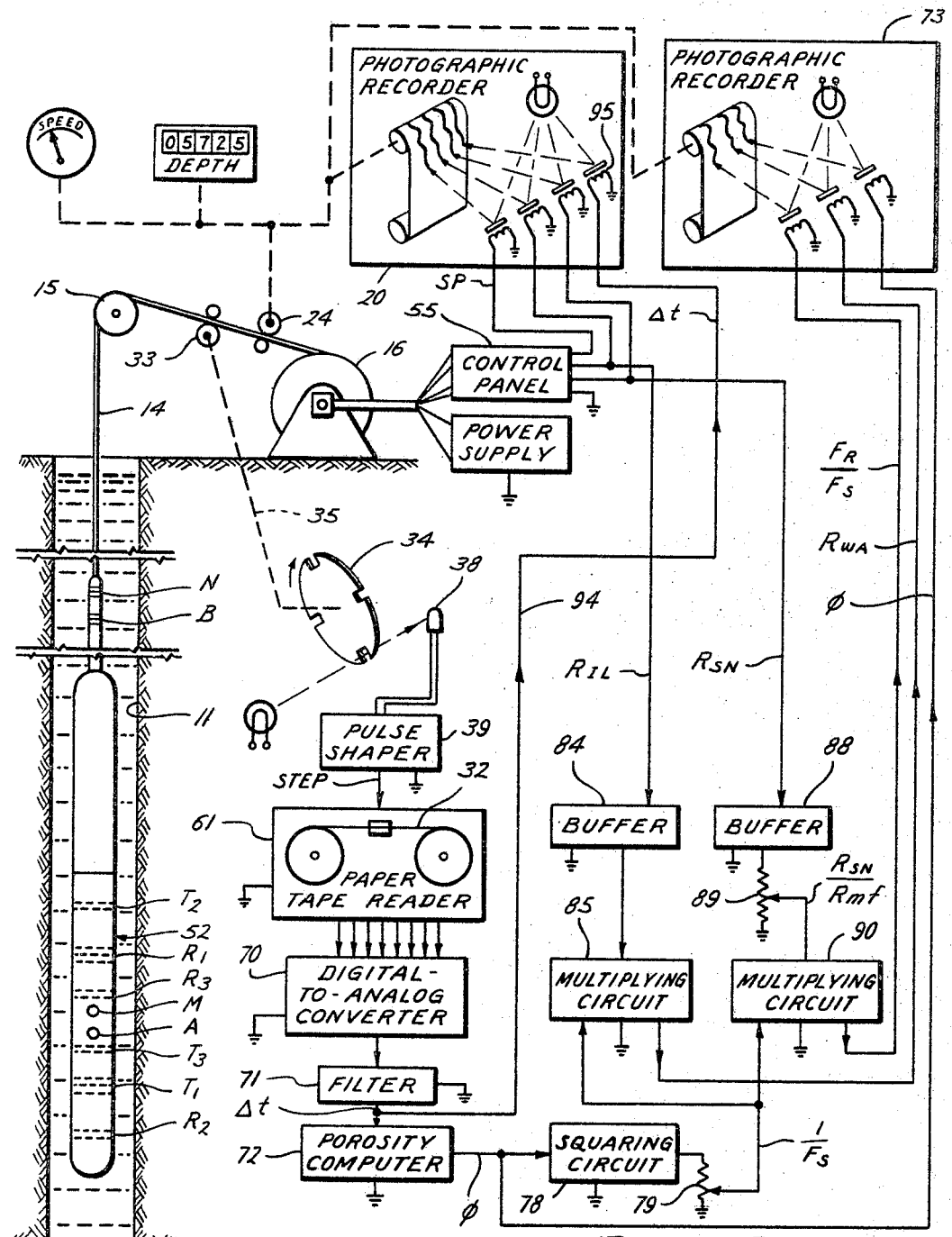
FIG. 6 illustrates in a schematic manner apparatus used in performing a second method in accordance with the present invention.

Referring now to FIG. 6 of the drawings, there is shown apparatus used in performing a modified method of the present invention. This method utilizes parts of the apparatus of FIG. 4 and parts of the apparatus of FIG. 5. As a preliminary step and before the apparatus shown in FIG. 6 is used, a paper tape recording of the sonic $\Delta t$ signal developed by a sonic logging device is made in the manner indicated in FIG. 1. The resulting recording tape 32 is then placed on the paper tape reader 61 of the FIG. 6 apparatus. The operation of the FIG. 6 apparatus is then ready to proceed. Thus, as the second step, the investigating system 52, which includes the deep investigation induction logging system and the shallow investigation electrode system, is moved through the borehole 11 and, at the same time, the recording tape 32 bearing the sonic signal is played back in synchronism therewith by the paper tape reader 61.

Since all three signals, namely, the sonic signal and the two resistivity signals, are now all available at the same time, these signals may be supplied directly to the appropriate computing apparatus without need for recording the two resistivity signals on a paper recording tape. The various computing circuits shown in FIG. 6 are the same as those previously considered in FIG. 5. In FIG 6, the photographic recorder 73 for the computed signals is driven in synchronism with the movement of the investigating apparatus 52 in the same manner as is the photographic recorder 20 for the uncomputed signals. In some cases, the computed signals may instead be supplied to the recorder 20 and recorded on the same photosensitive recording medium as are the uncomputed signals.

One additional feature which is shown in FIG. 6 is indicated by the connection 94 which connects the output of the filter 71 to an additional galvanometer 95 in the photographic recorder 20. This connection enables the recording of the sonic $\Delta t$ signal on the same recording medium on which the "live" signals from the investigating apparatus 52 are being recorded. Thus, the unmodified signals obtained on different trips through the borehole are all recorded on a single common log.

Referring now to FIG. 7 of the drawings, there is shown apparatus used in performing a further method of the present invention. The apparatus of FIG. 7 represents the case where it is desired to make three measurements by means of three different measuring devices on three separate trips through the borehole and then to record three signals derived from these three sets of measurements on a single common photographic recording medium. The purpose of this is to provide on the photographic recording medium a record or log of the type which is described in copending application Serial No. 192,662, filed on May 7, 1962, in the name of M. L. Millican.

The apparatus of FIG. 7 includes three separate paper tape readers 100, 101 and 102 for synchronously reproducing the signals recorded on three separate paper recording tapes 103, 104 and 105. The signal recorded on the first tape 103 is a $\Delta t$ sonic travel time signal. This signal is obtained and recorded in the same manner as indicated in FIG. 1. The signal recorded on the second tape 104 is a shallow-investigation resistivity signal $R_{xo}$. This signal may be obtained by using a short normal electrode system of the kind described in FIG. 4 but is preferably obtained by using a focused wall-engaging pad-type electrode system of the kind described in the copending Millican application. The recording of this $R_{xo}$ signal is performed in the same manner as indicated in FIG. 1 except that the sonic measuring device 10 is replaced by the appropriate shallow-investigation resistivity device. The signal recorded on the third recording tape 105 is a deep investigation resistivity signal $R_t$. It may be obtained by means of a focused guard-type electrode system as described in the copending Millican application or, instead, it may be obtained with an induction logging system of the kind described in connection with FIG. 4. This $R_t$ signal is recorded on the paper recording tape 105 in the same manner as indicated in FIG. 1, the deep investigation resistivity device being used in place of the sonic device shown in FIG. 1. For maximum precision in regard to depth coordination, the same logging cable (cable 14 of FIG. 1) and the same unloaded measuring wheel (wheel 33 of FIG. 1) and associated depth synchronizing elements should be used in the recording of each of these three sets of measurements.

The three recording tapes 103, 104 and 105 are moved in synchronism with one another during the reproduction or playback process depicted in FIG. 7 by supplying to each of the paper tape readers 100, 101 and 102 the synchronizing pulses generated by means of a motor 106, a rotating disc 107 and a photocell 108. This is the same type of pulse generating system previously considered. The resulting electrical pulses produced by photocell 108 are supplied to each of the paper tape readers by a pulse shaper 109.

The parallel binary output lines from the paper tape reader 100 are connected to a digital-to-analog converter 110 to provide an analog signal corresponding to the $\Delta t$ signal indications recorded on the paper tape 103. This $\Delta t$ analog signal is smoothed by a filter 111 and supplied to the input of an amplifier 112. In a similar manner, a second digital-to-analog converter 113 and a filter 114 are coupled to the paper tape reader 101 for supplying to the input of an amplifier 115 an analog signal corresponding to the $R_{xo}$ values recorded on the paper recording tape 104. Similarly, a third digital-to-analog converter 116 and a third filter 117 supply to the input of a third amplifier 118 an analog signal corresponding to the $R_t$ resistivity values recorded on the paper recording tape 105.

The sonic $\Delta t$ signal supplied to the amplifier 112 is converted to a porosity signal $\phi$ by the porosity computer 120. This porosity signal is then supplied to a photographic recorder 122 for providing a record thereof on a photosensitive recording medium 123. This is done by way of a mirror-type galvanometer 124 in the photographic recorder 122.

The fractional amount of the formation pore space which is occupied by water is described by the expression:

$$S_w^2 = \frac{R_w}{\phi^2 R_t} \quad (10)$$

where $S_w$ denotes the water saturation as a fraction of the pore space. The $a$ and $m$ factors of Equation 4 are assumed to be 1 and 2, respectively, which is particularly appropriate for the case of carbonate-type formations (limestones, etc.).

The relationship of Equation 10 can be rearranged in the form:

$$S_w \phi = \frac{1}{\sqrt{R_t/R_w}} \quad (11)$$

The quantity $S_w \phi$ has been found to be of particular significance when recorded on the same recording medium and to the same scale factor as the porosity signal $\phi$. To obtain this quantity, the $R_t$ signal at the input of amplifier 118 is modified by a potentiometer 125 which introduces the $R_w$ factor. The resulting ratio signal at the sliding tap of potentiometer 125 is then supplied to a function former 126. Function former 126 produces an output signal which is proportional to the reciprocal of the square root of the input signal. This satisfies Equation 11. This resulting output signal is then supplied to a galvanometer unit 127 in the photographic recorder 122.

For the case of the flushed portion of the formation immediately adjacent the borehole wall, the corresponding water saturation relationship is:

$$S_{xo} \phi = \frac{1}{\sqrt{R_{xo}/R_{mf}}} \quad (12)$$

where $S_{xo}$ denotes the flushed zone water saturation as a fraction of the pore space. The water in this flushed zone is, of course, the mud filtrate which has invaded laterally into the formation and not the connate formation water which was originally present. It is also desired to record the quantity $S_{xo}\phi$ on the common photosensitive recording medium 123 and to the same scale factor as the other signals. To this end, the $R_{xo}$ signal at the input of amplifier 115 is supplied by way of a potentiometer 128 to a function former 129. Adjustment of the sliding tap on potentiometer 128 introduces the appropriate value of $R_{mf}$. Function former 129 operates to develop an output signal which is proportional to the reciprocal of the square root of its input signal. This satisfies Equation 12. The resulting output signal is supplied to a galvanometer 130 in the photographic recorder 122.

Each of the three signals $\phi$, $S_{xo}\phi$ and $S_w\phi$ are recorded over the same range of the photosensitive recording medium 123 and to the same scale factor. The quantity $\phi$ denotes the fractional amount of the total formation volume which is occupied by pore space. The quantity $S_{xo}\phi$ denotes the fraction of the pore space in the flushed zone which is occupied by mud filtrate. The quantity $S_w\phi$ denotes the fraction of the pore space in the uncontaminated zone which is occupied by formation water. As is considered in greater detail in the copending Millican application, the relative separations, if any, of the recorder traces produced by these three signals, are indicative of the amounts of formation water, movable oil, and residual oil contained in the subsurface formations.

From the foregoing descriptions of the various embodiments of the invention, it is seen that various methods and apparatus are provided whereby borehole measurements made on different trips through the borehole may be coordinated or combined in a rapid and highly accurate manner to produce additional records or logs which provide improved indications of the subsurface conditions.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of investigation for boreholes drilled into the earth comprising: moving a first measuring device through the borehole for developing a first signal representative of a subsurface condition; recording indications of this first signal on a first recording medium; moving a second measuring device through the borehole for developing a second signal representative of a subsurface condition; recording indications of this second signal on a second recording medium; and synchronously reproducing the signal indications recorded on the two recording media for providing concurrent indications of the subsurface conditions as a function of depth in the borehole.

2. A method of investigation for boreholes drilled into the earth comprising: moving a first measuring device through the borehole for developing a first signal representative of a subsurface condition; recording indications of this first signal on a first recording medium; moving a second measuring device through the borehole for developing a second signal representative of a subsurface condition; recording indications of this second signal on a second recording medium; synchronously reproducing the signal indications recorded on the two recording media; and combining the reproduced signal indications for deriving a signal representative of a computed subsurface relationship as a function of depth in the borehole.

3. A method of investigation for boreholes drilled into the earth comprising: moving a first measuring device through the borehole for developing a first signal representative of a subsurface condition; recording indications of this first signal on a first recording medium; moving a second measuring device through the borehole for developing a second signal representative of a subsurface condition; recording indications of this second signal on a second recording medium; synchronously reproducing the signal indications recorded on the two recording media; and recording signals derived from the two sets of reproduced signal indications on a third and common recording medium as a function of depth in the borehole.

4. A method of investigation for boreholes drilled into the earth comprising: moving a first measuring device through the borehole for developing a first signal representative of a subsurface condition; recording indications of this first signal on a first recording medium; moving a second measuring device through the borehole for developing a second signal representative of a subsurface condition; recording indications of this second signal on a second recording medium; synchronously reproducing the signal indications recorded on the two recording media; combining the reproduced signal indications for deriving a signal representative of a computed subsurface relationship as a function of depth in the borehole; and recording the computed signal on a third recording medium as a function of depth in the borehole.

5. A method of investigation for boreholes drilled into the earth comprising: moving a first measuring device through the borehole for developing a first signal representative of a subsurface condition; recording indications of this first signal on a first recording medium; moving a second measuring device through the borehole for developing a second signal representative of a subsurface condition; recording indications of this second signal on a second recording medium; moving a third measuring device through the borehole for developing a third signal representative of a subsurface condition;

recording indications of this third signal on a third recording medium; and synchronously reproducing the signal indications on the three recording media for providing concurrent indications of the subsurface conditions as a function of depth in the borehole.

6. A method of investigation for boreholes drilled into the earth comprising: moving a first measuring device through the borehole for developing a first signal representative of a subsurface condition; recording indications of this first signal as coded perforations on a first paper recording tape; moving a second measuring device through the borehole for developing a second signal representative of a subsurface condition; recording indications of this second signal as coded perforations on a second paper recording tape; and synchronously reproducing the signal indications recorded on the two recording tapes for providing concurrent indications of the subsurface conditions as a function of depth in the borehole.

7. A method of investigation for boreholes drilled into the earth comprising: moving a first measuring device through the borehole for developing a first signal representative of a subsurface condition; recording indications of this first signal on a first recording medium which is moved in synchronism with the movement of the first measuring device through the borehole; moving a second measuring device through the borehole for developing a second signal representative of a subsurface condition; recording indications of this second signal on a second recording medium which is moved in synchronism with the movement of the second measuring device through the borehole; and reproducing the signal indications recorded on the two recording media while moving the two media in synchronism with one another for providing concurrent indications of the subsurface conditions as a function of depth in the borehole.

8. A method of investigation for boreholes drilled into the earth comprising moving a first measuring device through the borehole for developing a first signal representative of a subsurface condition; recording indications of this first signal on a first recording medium which is moved in direct proportion to the distance traversed by the first measuring device in the borehole; moving a second measuring device through the borehole for developing a second signal representative of a subsurface condition; recording indications of this second signal on a second recording medium which is moved in direct proportion to the distance traversed by the second measuring device in the borehole; and reproducing the signal indications recorded on the two recording media while moving the two media in synchronism with one another for providing concurrent indications of the subsurface conditions as a function of depth in the borehole.

9. A method of investigation for boreholes drilled into the earth comprising: moving a first measuring device through the borehole for developing a first signal representative of a subsurface condition; recording indications of this first signal on a first recording medium which is moved in synchronism with the movement of the first measuring device through the borehole; moving a second measuring device through the borehole for developing a second signal representative of a subsurface condition; recording indications of this second signal on a second recording medium which is moved in synchronism with the movement of the second measuring device through the borehole; reproducing the signal indications recorded on borehole; reproducing the signal indications recorded on the two recording media while moving the two media in synchronism with one another; and combining the reproduced signal indications for deriving a signal representative of a computed subsurface relationship as a function of depth in the borehole.

10. A method of investigation for boreholes drilled into the earth comprising: moving a first measuring device through the borehole for developing a first signal representative of a subsurface condition; recording indications of this first signal on a first recording medium which is moved in synchronism with the movement of the first measuring device through the borehole; moving a second measuring device through the borehole for developing a second signal representative of a subsurface condition; recording indications of this second signal on a second recording medium which is moved in synchronism with the movement of the second measuring device through the borehole; reproducing the signal indications recorded on the two recording media while moving the two media in synchronism with one another; and recording signals derived from the two sets of reproduced signal indications on a third and common recording medium which is being moved in synchronism with the first two recording media during the reproduction process.

11. A method of investigation for boreholes drilled into the earth comprising: moving a first measuring device through the borehole for developing a first signal representative of a subsurface condition; recording indications of this first signal on a first recording medium which is moved in synchronism with the movement of the first measuring device through the borehole; moving a second measuring device through the borehole for developing a second signal representative of a subsurface condition; recording indications of this second signal on a second recording medium which is moved in synchronism with the movement of the second measuring device through the borehole; reproducing the signal indications recorded on the two recording media while moving the two media in synchronism with one another; combining the reproduced signal indications for deriving a signal representative of a computed subsurface relationship as a function of depth in the borehole; and recording the computed signal on a third recording medium which is being moved in synchronism with the first two recording media during the reproduction process.

12. A method of investigation for boreholes drilled into the earth comprising: moving a first measuring device through the borehole for developing a first signal representative of a subsurface condition; recording indications of this first signal on a first recording medium which is moved in synchronism with the movement of the first measuring device through the borehole; moving a second measuring device through the borehole for developing a second signal representative of a subsurface condition; recording indications of this second signal on a second recording medium which is moved in synchronism with the movement of the second measuring device through the borehole; moving a third measuring device through the borehole for developing a third signal representative of a subsurface condition; recording indications of this third signal on a third recording medium which is moved in synchronism with the movement of the third measuring device through the borehole; and reproducing the signal indications recorded on the three recording media while moving the three media in synchronism with one another for providing concurrent indications of the subsurface conditions as a function of depth in the borehole.

13. A method of investigation for boreholes drilled into the earth comprising: moving a first measuring device through the borehole for developing a first signal representative of a subsurface condition; recording indications of this first signal as coded perforations on a first paper recording tape which is stepped in synchronism with the movement of the first measuring device through the borehole; moving a second measuring device through the borehole for developing a second signal representative of a subsurface condition; recording indications of this second signal as coded perforations on a second paper recording tape which is stepped in synchronism with the movement of the second measuring device through the borehole; and reproducing the signal indications recorded on the two paper recording tapes while stepping the two tapes in synchronism with one another for providing concurrent indications of the subsurface conditions as a function of depth in the borehole.

14. A method of investigation for boreholes drilled into the earth comprising: alternately placing distinguishable first and second control indications at different longitudinal locations along a length of recording tape; moving an investigating system including a pair of measuring devices through the borehole for developing a pair of signals representative of subsurface conditions; advancing the portion of the recording tape having the control indications thereon in synchronism with the movement of the investigating system through the borehole; recording indications of the signal developed by one of the measuring devices on the recording tape at locations determined by the first control indications; and recording indications of the signal developed by the other of the measuring devices on the recording tape at locations determined by the second control indications, thereby to provide a composite tape record of the two borehole measurements.

15. A method of investigation for boreholes drilled into the earth comprising: alternately placing distinguishable first and second control indications on a first recording tape; moving an investigating system including a pair of measuring devices through the borehole for developing a pair of signals representative of subsurface conditions; advancing the first recording tape in synchronism with the movement of the investigating system through the borehole; recording an indication of the signal developed by one of the measuring devices on the first recording tape for each occurrence of the first control indication; recording an indication of the signal developed by the other of the measuring devices on the first recording tape for each occurrence of the second control indication; moving an investigating system including a third measuring device through the borehole for developing a third signal representative of a subsurface condition; recording indications of this third signal on a second recording tape which is advanced in synchronism with the movement of the third measuring device through the borehole; reproducing the signal indications recorded on the two recording tapes while moving the two tapes in synchronism with one another; and selectively supplying the signal indications reproduced from the first recording tape to different ones of a pair of output circuits, the signal indications reproduced during the occurrence of the first control indications being supplied to one of the output circuits and the signal indications reproduced during the occurrence of the second control indications being supplied to the other of the output circuits.

16. A method of investigation for boreholes drilled into the earth comprising: moving a first measuring device through the borehole for developing a first signal representative of a subsurface condition; recording indications of this first signal on a recording medium which is moved in synchronism with the movement of the first measuring device through the borehole; subsequently moving a second measuring device through the borehole for developing a second signal representative of a subsurface condition; and reproducing the signal indications recorded on the recording medium while moving the recording medium in synchronism with the movement of the second measuring device through the borehole for providing concurrent indications of the two subsurface conditions as a function of depth in the borehole.

17. A method of investigation for boreholes drilled into the earth comprising: moving a first measuring device through the borehole for developing a first signal representative of a subsurface condition; recording indications of this first signal as coded perforations on a paper recording tape which is moved in synchronism with the movement of the first measuring device through the borehole; subsequently moving a second measuring device through the borehole for developing a second signal representative of a subsurface condition; and reproducing the signal indications recorded on the paper recording tape while moving the recording tape in synchronism with the movement of the second measuring device through the borehole for providing concurrent indications of the two subsurface conditions as a function of depth in the borehole.

18. A method of investigation for boreholes drilled into the earth comprising: moving a first measuring device through the borehole for developing a first signal representative of a subsurface condition; recording indications of this first signal on a recording medium which is moved in synchronism with the movement of the first measuring device through the borehole; subsequently moving a second measuring device through the borehole for developing a second signal representative of a subsurface condition; reproducing the signal indications recorded on the recording medium while moving the recording medium in synchronism with the movement of the second measuring device through the borehole; and recording signals derived from the second borehole signal and the reproduced signal indications on a common recording medium while moving this common recording medium in synchronism with the movement of the second measuring device through the borehole.

19. A method of investigation for boreholes drilled into the earth comprising: moving a first measuring device through the borehole for developing a first signal representative of a subsurface condition; recording indications of this first signal as coded perforations on a paper recording tape which is moved in synchronism with the movement of the first measuring device through the borehole; subsequently moving a second measuring device through the borehole for developing a second signal representative of a subsurface condition; reproducing the signal indications recorded on the paper recording tape while moving the recording tape in synchronism with the movement of the second measuring device through the borehole; and recording signals derived from the second borehole signal and the reproduced signal indications on a photographic recording medium while moving this photographic recording medium in synchronism with the movement of the second measuring device through the borehole.

20. A system for investigating boreholes drilled into the earth comprising: first and second measuring devices adapted for separate movement through the borehole for developing first and second signals representative of subsurface conditions; tape recording means for recording these signals on separate recording tapes; first and second tape reproducing means for concurrently reproducing the signals recorded on the separate recording tapes; and photographic recording means for recording signals derived from the reproduced tape signals on a photosensitive recording medium.

21. A system for investigating boreholes drilled into the earth comprising: first and second measuring devices individually adapted for movement through the borehole at the end of a cable suspended from the surface of the earth for developing signals representative of subsurface conditions; recording means for recording the signals for the different measuring devices on separate recording media; depth synchronizing means including an unloaded measuring wheel which engages the suspension cable for driving the recording means in synchronism with the movement of the measuring devices through the borehole; first and second reproducing means for reproducing the signals recorded on the separate recording media; and means for driving the reproducing means in synchronism with one another for reproducing the recorded signals in a concurrent manner as a function of depth in the borehole.

22. A system for investigating bore holes drilled into the earth comprising: first and second measuring devices individually adapted for movement through the borehole at the end of a cable suspended from the surface of the earth for developing signals representative of subsurface conditions; tape recording means for recording the signals for the different measuring devices on separate recording tapes; depth synchronizing means including an unloaded measuring wheel which engages the suspension cable for driving the tape recording means in synchronism with the movement of the measuring devices through the borehole; first and second tape playback means for reproducing the signals recorded on the separate recording tapes; and means for driving the tape playback means in synchronism with one another for reproducing the recorded signals in a concurrent manner as a function of depth in the borehole.

23. A system for investigating boreholes drilled into the earth comprising: first and second measuring devices individually adapted for movement through the borehole at the end of a cable suspended from the surface of the earth for developing signals representative of subsurface conditions; tape recording means for recording the signals for the different measuring devices on separate recording tapes; depth synchronizing means including an unloaded measuring wheel which engages the suspension cable for driving the tape recording means in synchronism with the movement of the measuring devices through the borehole; first and second tape playback means for reproducing the signals recorded on the separate recording tapes; means for driving the tape playback means in synchronism with one another for reproducing the recorded signals in a concurrent manner as a function of depth in the borehole; and photographic recording means for recording signals derived from the reproduced tape signals on a photosensitive recording medium which is also being driven by the means for driving the tape playback means.

24. In a borehole investigating system wherein a measuring device is moved through the borehole by means of a cable suspended from the surface of the earth, the combination comprising: an unloaded measuring wheel adapted to engage the cable and be rotated by movement thereof; tape recording means for recording indications of the measuring device signals on a recording tape; signal generating means coupled to the measuring wheel for producing synchronizing signals representative of the movement of the measuring device through the borehole while causing negligible loading on the measuring wheel; and means for supplying the synchronizing signals to the tape recording means for synchronizing the movement of the recording tape with the movement of the measuring device through the borehole.

25. In a borehole investigating system wherein a measuring device is moved through the borehole by means of a cable suspended from the surface of the earth, the combination comprising: an unloaded measuring wheel adapted to engage the cable and be rotated by movement thereof; tape recording means for recording indications of the measuring device signals on a recording tape; pulse generating means coupled to the measuring wheel for producing a synchronizing pulse each time the measuring device moves a predetermined incremental distance in the borehole while causing negligible loading on the measuring wheel; and means for supplying the resulting synchronizing pulses to the tape recording means for causing the recording tape to move in synchronism with the movement of the measuring device through the borehole.

26. In a borehole investigating system wherein a measuring device is moved through the borehole by means of a cable suspended from the surface of the earth, the combination comprising: an unloaded measuring wheel adapted to engage the cable and be rotated by movement thereof; paper tape recording means for recording indications of the measuring device signals as perforations on a paper recording tape; signal generating means coupled to the measuring wheel for producing synchronizing signals representative of the movement of the measuring device through the borehole while causing negligible loading on the measuring wheel; and means for supplying the synchronizing signals to the paper tape recording means for stepping the paper recording tape in synchronism with the movement of the measuring device through the borehole.

27. In a borehole investigating system wherein a measuring device is moved through the borehole by means of a cable suspended from the surface of the earth, the combination comprising: an unloaded measuring wheel adapted to engage the cable and be rotated by movement thereof; paper tape recording means for recording indications of the measuring device signals as perforations on a paper recording tape; pulse generating means coupled to the measuring wheel for producing a synchronizing pulse each time the measuring device moves a predetermined incremental distance in the borehole while causing negligible loading on the measuring wheel; and means for supplying the resulting synchronizing pulses to the paper tape recording means for stepping the paper recording tape in synchronism with the movement of the measuring device through the borehole.

28. In a borehole investigating system wherein a measuring device is moved through the borehole by means of a cable suspended from the surface of the earth, the combination comprising: first and second measuring wheels adapted to engage the cable and be rotated by movement thereof; a photographic recorder for recording the signals developed by the measuring device on a photosensitive recording medium; linkage means coupling the first measuring wheel to the photographic recorder for moving the photosensitive recording medium in synchronism with the movement of the measuring device through the borehole; tape recording means for recording indications of the measuring device signals on a recording tape; low-torque signal generating means coupled to the second measuring wheel for producing synchronizing signals representative of the movement of the measuring device through the borehole; and means for supplying the synchronizing signals to the tape recording means for synchronizing the movement of the recording tape with the movement of the measuring device through the borehole.

29. In a borehole investigating system wherein a measuring device is moved through the borehole by means of a cable suspended from the surface of the earth, the combination comprising: first and second measuring wheels adapted to engage the cable and be rotated by movement thereof; a photographic recorder for recording the signals developed by the measuring device on a photosensitive recording medium; linkage means coupling the first measuring wheel to the photographic recorder for moving the photosensitive recording medium in synchronism with the movement of the measuring device through the borehole; paper tape recording means for recording indications of the measuring device signals on a paper recording tape; low-torque pulse generating means coupled to the second measuring wheel for producing synchronizing pulses representative of the movement of the measuring device through the borehole; and means for supplying the synchronizing pulses to the paper tape recording means for stepping the paper recording tape in synchronism with the movement of the measuring device through the borehole.

30. A method of investigation for boreholes drilled into the earth comprising: placing distinguishable first and second sets of control indications at different longitudinal locations along a length of recording tape; moving an investigating system including a measuring device through the borehole for developing a first signal representative of a subsurface condition; supplying a second signal representative of a further quantity of interest; advancing the portion of the recording tape having the control indications thereon in synchronism with the movement of the investigating system through the borehole; recording indications of the first signal on the recording tape at locations determined by the first control indications; and recording indications of the second signal on the recording tape at locations determined by the second control indications, thereby to provide a composite tape record of the two signals.

31. A method of investigation for boreholes drilled into the earth comprising: placing distinguishable first and second sets of control indications at different longitudinal locations along a length of recording tape; moving an investigating system including a measuring device through the borehole for developing a first signal representative of a subsurface condition; supplying a second signal representative of a further quantity of interest; advancing the portion of the recording tape having the control indications thereon in synchronism with the movement of the investigating system through the borehole; recording indications of the first signal on the recording tape at locations determined by the first control indications; and recording indications of the second signal on the recording tape at locations determined by the second control indications; reproducing the signal indications recorded on the recording tape; and selectively supplying the signal indications reproduced from the recording tape to different ones of a pair of output circuits, the signal indications reproduced during the occurrence of the first control indications being supplied to one of the output circuits and the signal indications reproduced during the occurrence of the second control indications being supplied to the other of the output circuits.

32. A method of investigation for boreholes drilled into the earth comprising: moving a first measuring device through the borehole for developing a first signal representative of a subsurface condition; recording indications of this first signal on a recording medium which is moved in synchronism with the movement of the first measuring device through the borehole; subsequently moving a second measuring device through the borehole for developing a second signal representative of a subsurface condition; reproducing the signal indications recorded on the recording medium while moving the recording medium in synchronism with the movement of the second measuring device through the borehole; and combining signals derived from the second borehole signal and the reproduced signal indications for deriving a signal representative of a computed subsurface relationship as a function of depth in the borehole.

References Cited

UNITED STATES PATENTS

| | | | |
|---|---|---|---|
| Re. 24,280 | 2/1957 | Stripling | 340—18 X |
| 2,427,421 | 9/1947 | Rieber | 346—74 |
| 2,436,503 | 2/1948 | Cleveland | 340—18 |
| 2,547,876 | 4/1951 | Krasnow | 340—18 X |
| 2,659,014 | 11/1953 | Scherbatskoy | 340—18 |
| 2,771,593 | 11/1956 | Straehl | 340—15.5 X |
| 2,879,126 | 3/1959 | James. | |
| 2,963,640 | 12/1960 | Buckner | 324—1 |
| 3,019,414 | 1/1962 | Peterson | 340—18 |
| 3,093,810 | 6/1963 | Geyer | 340—18 |
| 3,113,290 | 12/1963 | Walker | 340—18 |
| 3,148,352 | 9/1964 | Summers | 340—18 |
| 3,181,117 | 4/1965 | Sloughter | 340—18 |
| 3,277,440 | 10/1966 | Gouilloud et al. | 340—18 |

FOREIGN PATENTS 244,156 4/1963 Australia.

BENJAMIN A. BORCHELT, *Primary Examiner.*

CHESTER L. JUSTUS, *Examiner.*

R. M. SKOLNIK, W. KUJAWA, *Assistant Examiners.*